H. L. JOHNSON.
FISHING TACKLE.
APPLICATION FILED DEC. 29, 1920.
1,386,061.
Patented Aug. 2, 1921.
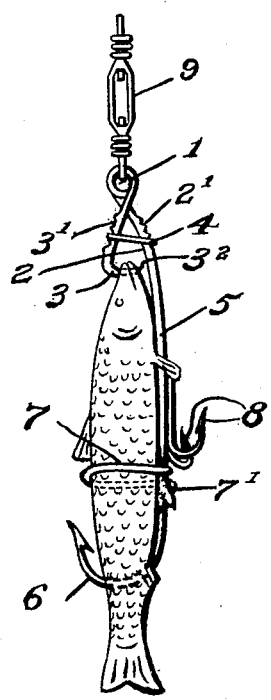
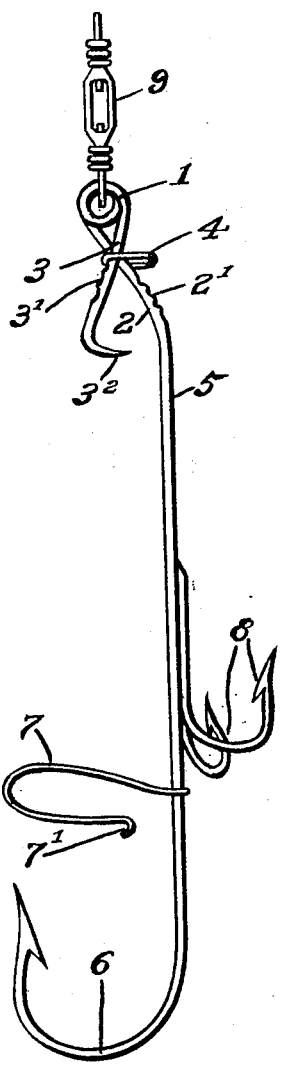
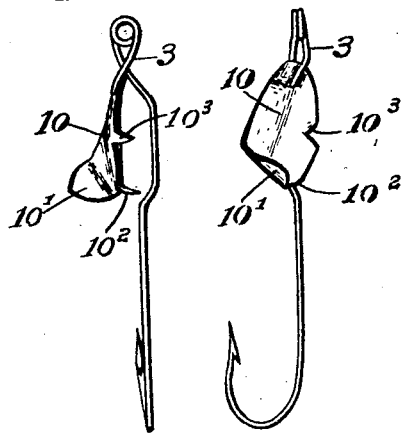
Inventor
Herbert L. Johnson
By Ellis Spear Jr.
Attorney

UNITED STATES PATENT OFFICE.

HERBERT LAWRENCE JOHNSON, OF YARMOUTH, MAINE, ASSIGNOR TO GEORGE F. LOWELL, OF FREEPORT, MAINE.

FISHING-TACKLE.

1,386,061. Specification of Letters Patent. Patented Aug. 2, 1921.

Application filed December 29, 1920. Serial No. 433,864.

*To all whom it may concern:*

Be it known that I, HERBERT LAWRENCE JOHNSON, a citizen of the United States, residing at Yarmouth, county of Cumberland, Maine, have invented certain new and useful Improvements in Fishing-Tackle, of which the following is a specification.

This invention relates to fishing tackle and particularly to bait gear especially adapted for casting or trolling with a minnow, frog or other bait.

As is well known, much of the success of angling with living bait depends upon the presentation of the bait under normal conditions of appearance and in as close resemblance to natural action as possible. For the purposes of this application, I shall discuss my invention in connection with the use of the minnow inasmuch as the live minnow presents the maximum of difficulty in proper handling and is at the same time one of the most successful baits in view of the common habits of the large fish to feed upon the small.

In the accompanying drawings I have shown as an illustrative embodiment a structure which is well adapted to use and at the same time is inexpensive and simple. In these drawings:

Figure I is a view of a bait gear in accordance with my invention,

Fig. II is a view of such gear with a minnow rigged thereon, and Figs. III and IV modifications of the head clamp.

My gear consists of a spring pin section formed with a resilient double turn 1 having a shank 2 notched at $2^1$, and a free arm 3 notched at $3^1$ and having an inturned pin end $3^2$. The arms 2 and 3 are crossed and inserted over them is a slidable link 4 which may be lodged on the opposite shanks 2 and 3 in selective engagement with any of the notches $2^1$, $3^1$ to hold the pin end $3^2$ in its clamped position through the lips of the fish as shown in Fig. II.

As appears in the drawing, the shank 2 is continued at 5 and terminates in a large hook 6. The shank 5 is preferably of such length that the hook 6 will lie across the tail of the fish in the general region of the anal fin. This leaves the fish with considerable freedom of tail movement, either voluntary or simulated, and at the same time somewhat covers the hook and conceals its presence. Furthermore, for those fish striking from the rear the hook is thus disposed in the most effective position to be engaged at the first bite of the capturing rush.

In order to dispose the hook in this position, I provide just above the hook a resilient loop 7 adapted to be sprung over the fish to hold the shank 5 closely against the belly. The hook 7 is provided with an upturned point adapted to be engaged with the shank 5 to hold the bait firmly in place. Just above the loop 7 I preferably mount one or more hooks 8. These hooks are preferably disposed in the region of the ventral fins, being thus normally concealed and being available if the bait is struck by a lateral rush.

In practice, with the shank 3 in the released position shown in Fig. I, the head of the fish is brought up in such position that the mouth in the region of the lips will be penetrated by the pin $3^2$. This is a humane manner of holding inasmuch as fish are notoriously lacking in feeling in the region of the mouth. In addition, the pin $3^2$ also holds the mouth of the fish shut or at least brings no opening strain on either jaw, thus avoiding drowning the bait as so often occurs with improper hooking.

With the pin thus lodged, the link 4 is moved down until the pin is held against the shank 5. This covers the point of the pin and avoids any chance of the bait slipping off and also covers the point against engagement with weeds, snags or other obstacles.

The minnow is then laid along the shank 5 and the girdling loop 7 passed around the tail and hooked at its free end $7^1$ over the shank. In this position the minnow is well balanced and free for a maximum amount of natural movement. It may furthermore be trolled or cast or sunk for still fishing.

While I find that the locking ring or link 4 is of advantage especially in larger sizes of hooks it may be omitted in many cases as the action of the spring loop 1 is sufficient to hold the ordinary minnow.

In cases where trolling is practised or with some anglers even in casting, it is desired to spin the bait. My invention therefore contemplates the provision of a blade or rotating flange 10. This blade can be conveniently attached to the spring arm 3 or formed thereon. It preferably has, as shown in Fig. IV, an angular portion bent out to give rotation to the blade. At its lower corner the point of the blade is bent in as at 10² thus securing a penetrating point corresponding to the pin point 3² of the form shown in Fig. I.

Inasmuch as almost any type of fishing of this nature involves a certain amount of trolling movement, I provide a swivel 9 engaged through the loop 1 as is customary in such gear. The size and rig of the hooks and shank may and naturally would be somewhat varied. The different elements may be variously connected and the shank 5 in particular may obviously be of metal or wire. All such modifications are within the spirit of my invention if within the limits of the appended claims.

What I therefore claim and desire to secure by Letters Patent is:—

1. A device of the class described, comprising a resilient head clamp formed as a coiled loop with crossed members, one of said members having an inwardly turned pin end and the other of said members being oppositely disposed and alined therewith, and a body clamp connected with said last named member.

2. A device of the class described, comprising a resilient head clamp formed as a coiled loop with crossed members, one of said members having an inwardly turned pin end and the other of said members being oppositely disposed and alined therewith, and a bait encircling loop mounted at one end on said last named member and having its free end disposed for detachable engagement therewith.

3. A bait holder, comprising a resilient head clamp formed as a coiled loop with crossed members, one of said members extending as a support for the body of the bait and the other member terminating in an inwardly turned pin end adapted to be passed through the head of the bait and to abut said extended member, and releasable means for holding said crossed members in bait clamping relation.

4. A bait holder, comprising a resilient head clamp formed as a coiled loop with crossed members, one of said members extending as a support for the body of the bait and the other member terminating in an inwardly turned pin end adapted to be passed through the head of the bait and to abut said extended member, and both of said crossed members provided with notches, and a retaining ring adjustable in said notches of the crossed member to draw said members toward each other in bait clamping relation.

5. In a bait holder, a resilient head clamp comprising a longitudinally disposed bait supporting member and an oppositely disposed pin end adapted to be passed through the head of the bait and to abut the longitudinally disposed member, a band encircling said members for releasably retaining them in bait clamping relation, and a body clamp permanently engaged at one end with said longitudinally disposed member and having its opposite end releasably engageable with said member.

In testimony whereof I affix my signature in presence of two witnesses.

HERBERT LAWRENCE JOHNSON.

Witnesses:
ANNA D. ROWE,
WILLIAM H. ROWE.